C. SPRECKELS.
TIRE WRAPPING MACHINE.
APPLICATION FILED FEB. 28, 1918.

1,369,715.

Patented Feb. 22, 1921.
6 SHEETS—SHEET 1.

Witnesses

Inventor,
Claus Spreckels,
By
His Attorney.

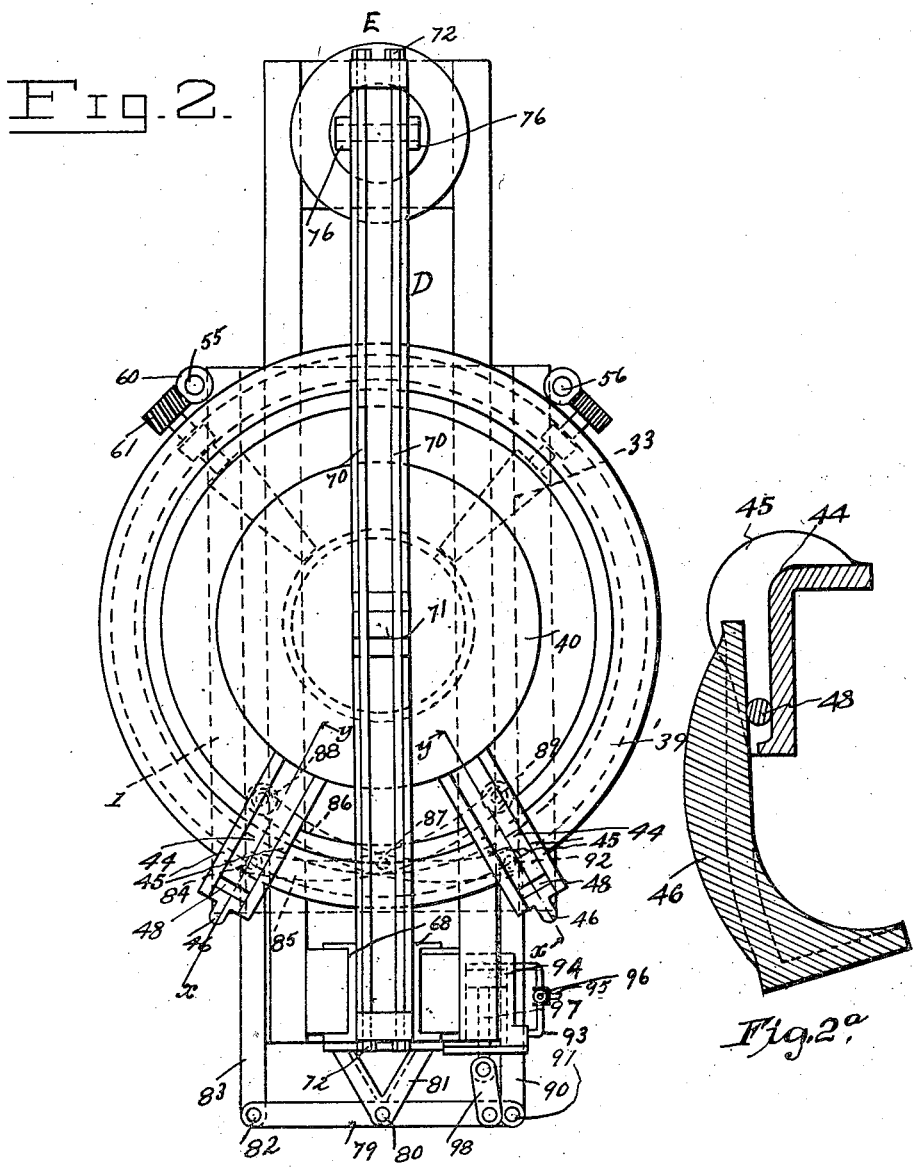

C. SPRECKELS.
TIRE WRAPPING MACHINE.
APPLICATION FILED FEB. 28, 1918.
1,369,715.
Patented Feb. 22, 1921.
6 SHEETS—SHEET 3.
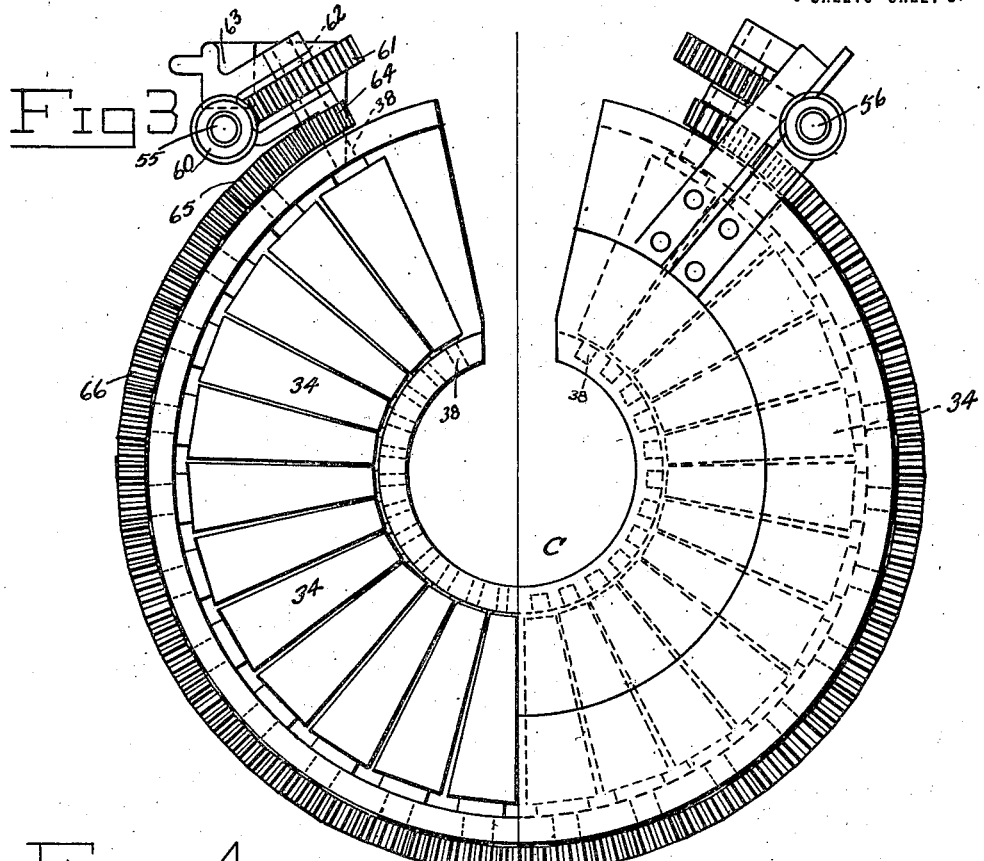
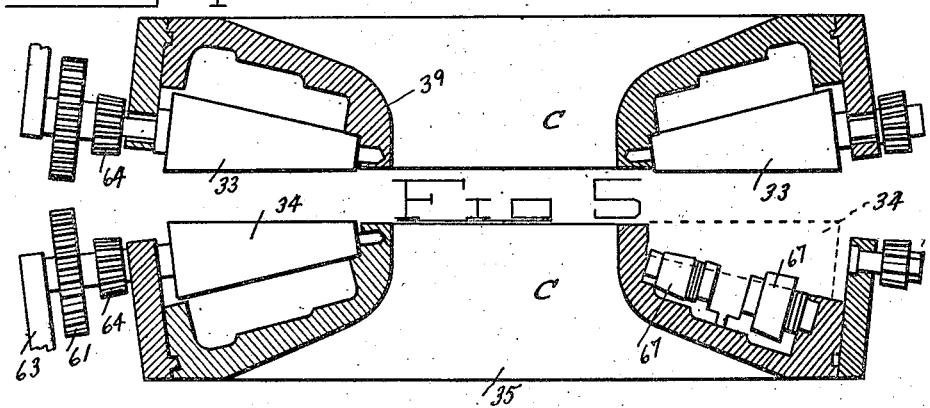

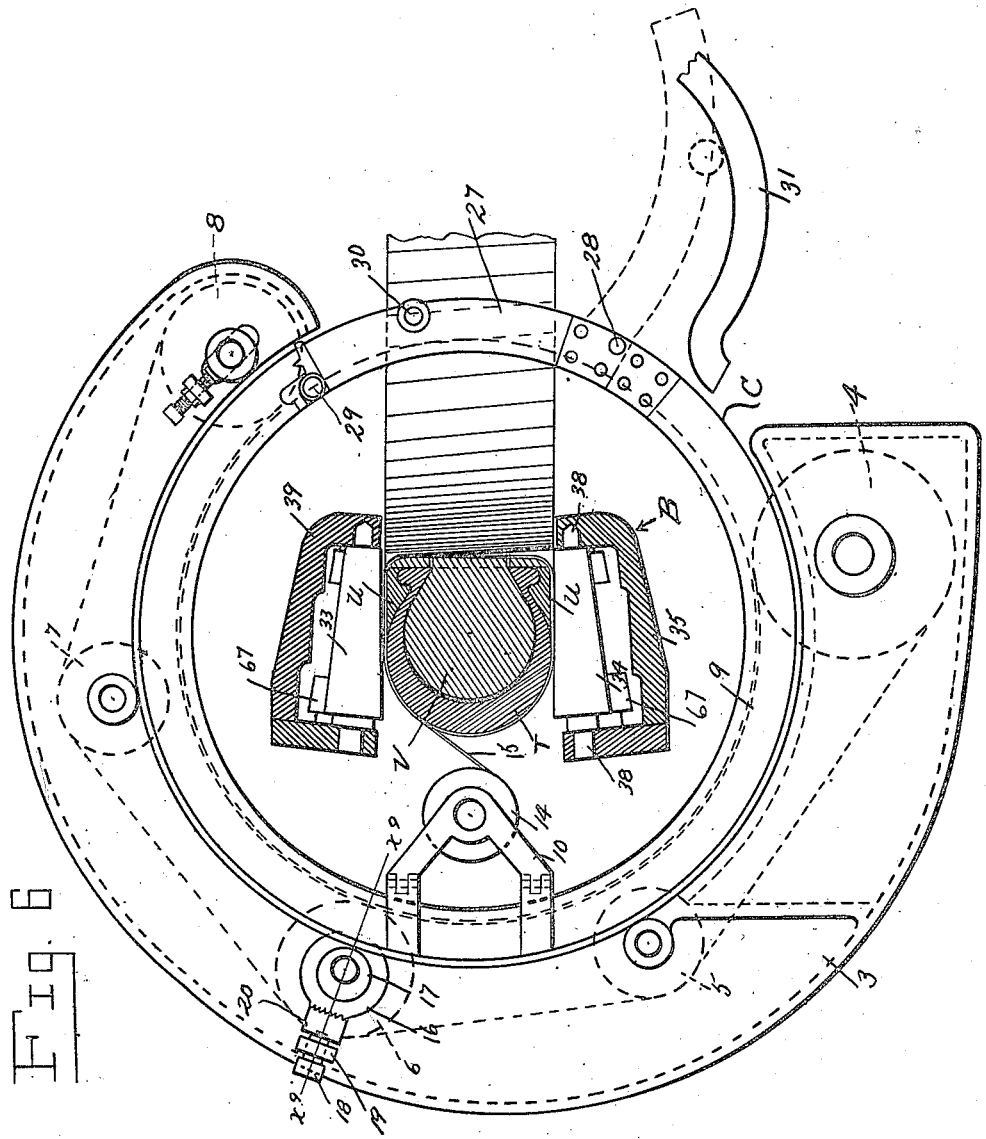

C. SPRECKELS.
TIRE WRAPPING MACHINE.
APPLICATION FILED FEB. 28, 1918.
1,369,715.
Patented Feb. 22, 1921.
6 SHEETS—SHEET 5.
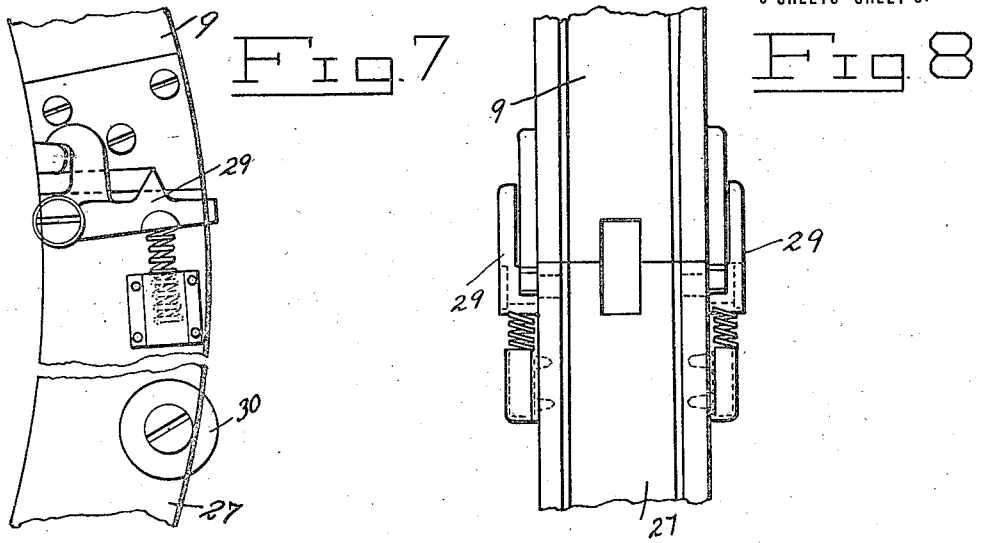
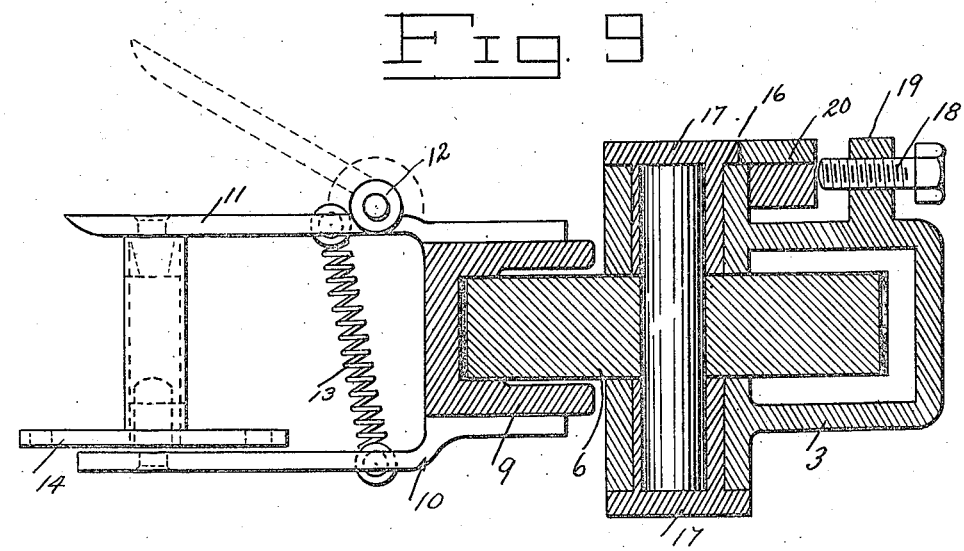
Witnesses
H. Gearing
Chas. J. Ehmen
Inventor,
Claus Spreckels,
By
His Attorney.

C. SPRECKELS.
TIRE WRAPPING MACHINE.
APPLICATION FILED FEB. 28, 1918.
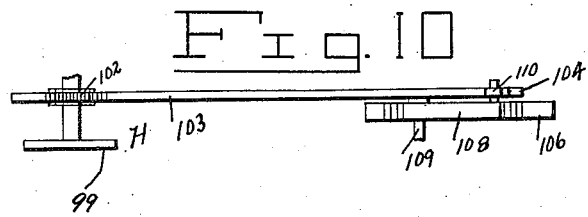
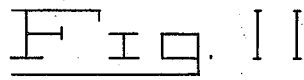
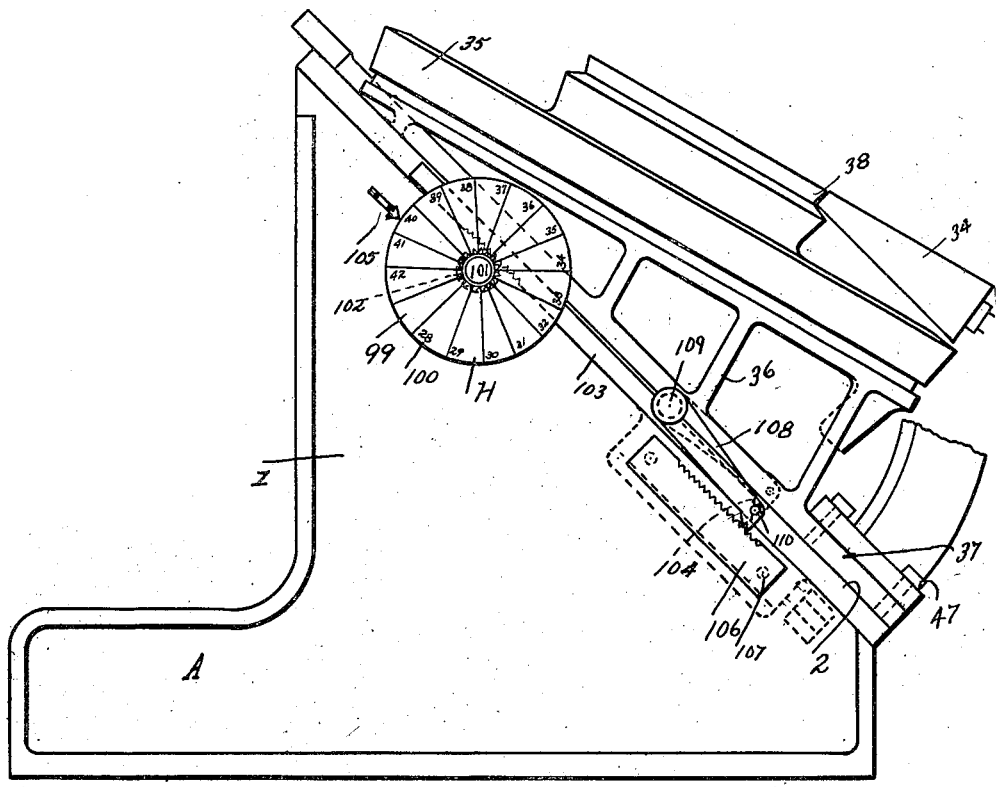

UNITED STATES PATENT OFFICE.

CLAUS SPRECKELS, OF SAN DIEGO, CALIFORNIA.

TIRE-WRAPPING MACHINE.

1,369,715.　　　　　Specification of Letters Patent.　　Patented Feb. 22, 1921.

Application filed February 28, 1918. Serial No. 219,680.

*To all whom it may concern:*

Be it known, that I, CLAUS SPRECKELS, a citizen of the United States, residing at San Diego, in the county of San Diego and State of California, have invented new and useful Improvements in Tire-Wrapping Machines, of which the following is a specification.

This invention relates to improvements in machines for wrapping pneumatic tires.

Prior to the subjecting of a tire or carcass to the curing process the side rings or side rings and matrix, are placed upon the tire or carcass in their proper positions and must be thus held during the curing process. The present invention relates to an improved machine for wrapping a fabric around the tire so as to hold the core, side rings, etc., in position, and at the same time permit the tire to be subject to the action of the curing process.

One of the objects of the invention is to provide a tire wrapping machine of the character above outlined which may be easily and efficaciously operated to wrap a tire in an inexpensive and reliable manner under even tension.

Another object is to provide a tire wrapping machine which may be readily and easily adjusted for the wrapping of tires of various sizes.

Another object of the invention is to provide a tire wrapping machine in which a tire being wrapped will at all times be held in a proper position to provide for the wrapping thereof under even tension.

Another and more specific object of the invention is to provide a tire wrapping machine in which the tire holding or supporting means and the shuttle means which acts to apply the fabric wrapping upon the tire, are so peculiarly relatively arranged, associated and constructed and relatively adjustably disposed, that the tire may be handled in the removal or positioning thereof and during the operation of wrapping, in a more reliable, easy, expeditious and efficacious manner, and further, so that the wrapping will be more secure and evenly applied to the tire.

The invention further consists in the novel and useful provision, combination, inter-relation and association of all of the parts, elements and features of the machine, all as hereinafter described, shown in the accompanying drawings and finally pointed out in the appended claims.

In the drawings:

Fig. 2 is a top plan view of the machine shown in Fig. 1;

Figure 1:
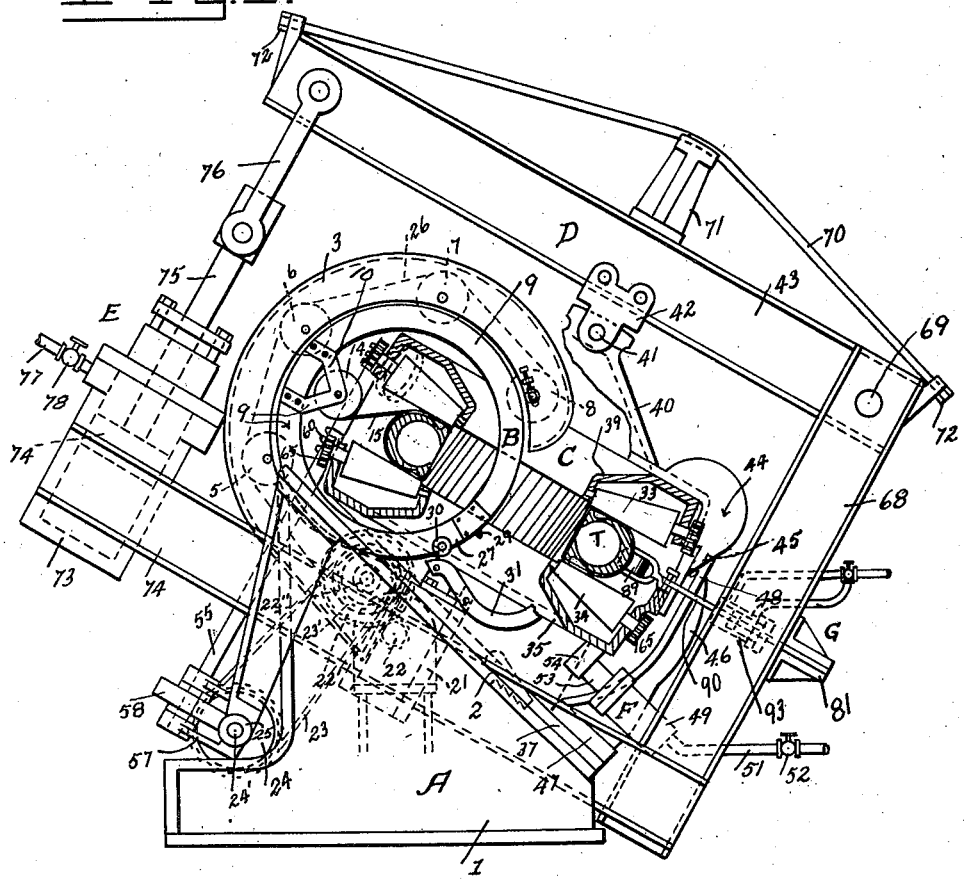
Figure 1 is a side elevation of a tire wrapping machine constructed in accordance with the present invention, showing parts broken away and in section.

Fig. 2$^a$ is a cross-sectional view of certain features used in the invention, and taken on the line $x\,y$ Fig. 2 and looking in the direction of the appended arrows.

Fig. 3 is a top plan view of the pressure rolls showing coöperative parts associated therewith and some of such parts in section;

Fig. 4 is a sectional view taken on line $x^4$—$x^4$ of Fig. 3;

Fig. 5 is a sectional view taken on line $x^4$—$x^4$ of Fig. 3;

Fig. 6 is a plan view of the shuttle means showing the tire in position and in section and the pressure rolls in elevation;

Fig. 7 is a detail fragmentary plan view of the means for locking the shuttle in closed position;

Fig. 8 is a fragmentary side elevation of the means shown in Fig. 7;

Fig. 9 is an enlarged detail sectional view of the shuttle;

Fig. 10 is a top plan view of the adjustment setting means; and

Fig. 11 is an enlarged side elevation of the base of the machine showing the adjustment setting means and shiftable table.

Referring particularly to the drawings, A designates the base or support structure of the machine, B the shuttle carried thereby and which is adapted to wrap a fabric strip upon a tire, C a tire holding means which is shiftable relative to the means B and adapted to hold and turn or rotate a tire during the wrapping thereof, D a frame for supporting the means C, E a means for operating the frame so as to cause the means C to yieldingly press upon the tire held thereby, F a fluid operated means for shifting the means C, G an equalizing and guiding means for holding the tire in properly centered position, and H means for controlling the adjustment of the means C so as to position it for operation in connection with tires of various sizes.

The base or support A consists essentially of upright side members 1 which upon their upper edges are inclined and provided with flat supporting surfaces 2 that are adapted to support the shiftably mounted means C.

This base may be of any construction particularly suited for properly supporting the various elements of the machine and need not be described in detail.

The shuttle means B is fixed to the base A, particularly illustrated in detail in Fig. 6 of the drawings, and comprises an arcuate frame 3 fixed in upright position to the base A and provided with drive rollers or pulleys 4, 5, 6, 7 and 8 which extend between the flanges of a channeled ring 9, said ring constituting the main element of the shuttle means B. This frame 3 partially surrounds the ring 9, the rollers or pulleys 4, 5 and 8 acting as bearings to support and retain the ring 9 in rotatable and upright relation to the base A. A drum supporting frame 10 is fixed to the ring 9 and extends inwardly toward the center thereof. This frame 10 has one of its sides 11 hinged as at 12 and held in closed position by a retractile spring 13. A drum 14 upon which a quantity of fabric constituting the wrapping material 15 is wound, is removably mounted for rotation in and between the sides 11 of the frame 10.

There is provided an eccentric shuttle centering means generally designated 16 and which is adapted to coöperate with the roller 6. This means includes a bearing 17 which is eccentrically mounted upon the frame 3, a set screw 18 mounted within a lug 19 on the frame 3, and a serrated block 20 which is held in place by the set screw 18 and frictionally engages and holds the bearing 17 in adjusted position. This eccentric means also may be operated to increase or decrease the degree of frictional contact of the ring 9 with the rollers or pulleys 4, 5 and 8, and in this way the speed of rotation of the shuttle may be varied.

To provide for rotation of the rollers or pulleys 4, 5, 6, 7 and 8 and the ring 9, a driving means as follows is employed: A motor 21 is mounted within the base A and drives a pinion 22 which meshes with a gear 22' that is fixed to the shaft 22'' for the roller 4. A chain 23 is rove around a sprocket 23' which is also fixed to the shaft 22'' for the roller 4 and said chain is likewise rove around a sprocket 24 that is fixed and rotates a shaft 24', the latter being mounted in bearings 25 on the base A. Rove around the pulleys 8 and 4 is a belt 26, one course of which belt is extended around the outer sides of and in engagement with the rollers or pulleys 5, 6, 7 and 8, the other course of said belt being disposed within the channel of the ring 9 and in engagement with said ring. It will be seen that through the hereinbefore described shafts, belts, pulleys, and rollers the shuttle ring 9 will be rotated. The ring 9 is open upon one side thereof so as to permit of the removal and positioning of tires relative to the means C for holding the tire, and this open side is adapted to be closed by an arcuate ring section or gate 27. The gate 27 is hinged as at 28 to the ring 9 at one end and at its other end is locked with the ring by suitable spring latch means 29. A friction roller 30 is carried by the gate 27 near the free end thereof and is adapted to engage upon a curved supporting member 31 which member is fixedly mounted upon the base A.

The means C for supporting and rotating the tire and pressing the wrapping thereon consists of an upper and a lower set of annularly arranged pressure rolls designated 33 and 34 respectively. Said rolls are preferably arranged in opposed relation. Between these sets of rolls a tire such as the one T in Fig. 6 is mounted. These sets of rolls are arranged in an inclined position that is, the axis of each roll is inclined or angularly disposed so that the axis of an upper roller in relation to the axis of a lower roller is angled each to the other and each set is open on one side so as to give access to the shuttle means and permit of the wrapping of a tire through such openings or breaks. The lower set 34 is mounted upon a circular frame member 35 and the latter is supported by standards 36 upon a shiftable table or base 37. This table 37 is slidably or shiftably mounted upon the flat inclined surfaces 2 of the base A. The frame 35 is of annular cup-like form, the trunnions 38 of the rolls 34 being journaled in opposed sides thereof. The upper set of rolls 33 is mounted in an annular cup-like frame 39 which is provided with a centrally disposed upwardly ranging frusto-conical portion 40 that is rockingly pivoted as at 51 to a carriage or trolley member 42. These rolls 33 are the pressure rolls. This member 42 is slidably mounted upon a hinged frame member 43 of the frame D. The rolls 33 are mounted within the frame 39 in the same manner as are the rolls 34. The frame 39 is provided with downwardly extending arms 44 which are provided with outwardly extending flanges 45 between which are received the upper ends of each of the upwardly extending arms 46, the latter being fastened to the table 37, as at 47. These arms 44 and 46 are provided with opposed flat faces between which and between the flanges 45 of the arms 44 are disposed friction rollers 48. These arms 44 and 46 together with the rollers 48 dispose the upper and lower sets of rolls in proper relation to one another and permit free relative up and down movement thereof.

The means F for shifting the tire holding means C comprises a fluid operated cylinder 49 having a piston 50 therein. A pipe 51 is connected with the cylinder 49 and provides for the admission of operating fluid thereto. A valve 52 is mounted in the pipe 51 to control the flow of operating fluid to the cylinder. The piston rod 53 is adapted to engage an abutment 54 which depends from the lower side of the frame 35. Thus, when operating fluid is admitted to the cylinder 49, and the piston 50 and rod 53 are forced outwardly, the means C is moved or shifted relative to the means B, the carriage 42 rides upon the frame member 43 and the table 37 slides upon the supporting surfaces 2 of the base 1. In this way the means C may be shifted so as to provide for the wrapping of tires of different sizes.

There is provided a drive means for rotating the rolls 34 so that the tire T is rotated within the supporting means C. This drive means comprises shafts 55 and 56 both of which are rotatably mounted within pivoted bearings 57 that are mounted upon the shaft 24'. Each of the shafts 55 and 56 carries a worm wheel 58 and for each wheel 58 there is provided a worm 59 which is fixed to the shaft 24'. The shaft 55 on its upper end is provided with a worm 60 which meshes with a worm wheel 61 carried by a shaft 62, which shaft 62 is journaled within the frame 35 and in a suitable outer bearing 63. A pinion 64 is fixed to the shaft 62, one of the rolls 34 being mounted on said shaft. Each of the rolls 34 is provided with a pinion 65 upon its outer end, such pinions being disposed upon the outside of the frame 35. Pinions 66 are mounted on the frame 35 between the pinions 65 to provide rotative connection of all of the rolls 34. The shaft 56 is operatively connected with the rolls 33 in the same manner as is the shaft 55, and further description in this connection is not considered necessary. The rolls 33 and 34 are frusto-conical and preferably so disposed within their respective frames as to have their opposed surfaces substantially parallel. There are preferably provided bearing rolls 67 for each set of rolls 33 and 34. These bearing rolls are mounted within the frames upon the inner sides of the rolls 33 and 34.

The frame D comprises upwardly inclined beams 68 secured at their lower ends to the base A and which at their upper ends are hingedly or pivotally connected as at 69 to one end of the frame member 43. To strengthen this member 43 reinforcing rods 70 are extended longitudinally thereof over and upon an upwardly disposed cradle 71 which cradle is fixed to the upper side of the member 43, thus constituting a truss. These rods 70 are adjustably secured as at 72 at their ends to the ends of the member 43.

The means E for swinging the frame member 43 upon its hinge or pivot 69 comprises a cylinder 73 supported on the base A and in which is reciprocally mounted a piston 74 and a piston rod 75. The rod 75 is connected by a link 76 with the free end of the member 43 and an operating fluid supply pipe 77 is connected with the cylinder 73.

A valve 78 controls the passage of operating fluid through the pipe 77. When fluid is admitted to the cylinder 73 the piston 74 descends withdrawing the piston rod 75, and through the medium of the link 76 a downward pull upon the frame member 43 is effected. This downward pulling of this member 43 causes the frame 39 and the pressure rolls 33 carried thereby to be moved downwardly into yielding and firm engagement with the tire T holding the tire with the side rings thereon firmly between the rolls 33 and 34 so that an even and secure wrapping of the tire may be effected.

The means G for equalizing or centering and for guiding the tire T relative to the holding means C, comprises a rocking bar 79 that is pivoted as at 80 upon an outward extension 81 of the frame members 68. Pivoted as at 82 to one end of the bar 79 is a link 83 which at its other end is pivotally connected as at 84 with an arcuate arm 85. This arm and also a similar arm 86 have a common pivot 87. The inner ends of the arms 85 and 86 are provided with rollers 88 and 89, said rollers being adapted to engage with the tire as shown in Fig. 1 of the drawings. A link 90 is pivoted as at 91 to the other end of the bar 79 and also to the outer end of the arm 86 as at 92. A cylinder 93 having a fluid operated piston 94 therein is connected with a source of operating fluid supply by means of a pipe 95. This pipe is provided with a two-way valve 96 which controls the admission of fluid to either end of the cylinder 93. The cylinder 93 is secured to one of the frame members 68 and the piston 94 is provided with a piston rod 97 that is connected by a link 98 with the bar 79. Fluid may be admitted to the cylinder 93 so that movement of the piston rod in either direction will effect an equalizing or centering action upon the tire. When the piston rod 97 is forced outwardly under fluid pressure the link 90 is pulled outwardly and the arm 86 is moved inwardly at its inner end causing the roller 88 to be forced into engagement with and to move the tire inwardly, whereas the link 83 is moved inwardly and the arm 85 rocks so that the inner end thereof moves outwardly. This movement is reversed when the piston is operated in the opposite direction.

Referring particularly to Fig. 11 wherein the regulating means H is illustrated, 99 designates a gage disk which is preferably circular and provided with facial characters 100 which indicate the different sizes of tires. This disk 99 is rotatably mounted centrally as at 101 upon one side of the base A, or, there may be a disk upon each side of the base, and other mechanism to be later described which constitutes the means H may be likewise disposed upon each side. A pinion 102 is fixed to the disk 99 and meshes with a rack bar 103. This rack bar 103 is slidably mounted upon the base A and at its lower end is inclined so as to provide a cam surface 104. An indicator or pointer 105 is fixed to the base A and adapted to coöperate with the designations 100 upon the disk 99 so that one of said designations is moved opposite the pointer or indicator to fix the adjustment to be effected. Rack blocks or bars 106 are disposed beneath the rack bars 103, being fixedly mounted as at 107 upon the base A. Coöperating with the bar 106 is a pawl or dog 108 that is pivoted at one end as at 109 to the table 37 and at its other end engages with the teeth of the rack bar 106. Near its free end the pawl 108 carries a roller 110 and said roller is adapted to ride upon the cam surface 104 in case the table 37 is shifted past the point reckoned upon. In operating this means H, for example, as shown, the disk is set so that the parts of the machine will be moved or set to operate upon a tire having a circumference of 41 inches. The setting of the disk 99 causes a movement of the rack bar 103, such that the cam 104 is disposed in a pre-determined relation to the rack bar 106 and dog 108. Thus, when the table 37 is shifted the roller 110 will ride upon the cam 104 and the dog 108 will be lifted from engagement with the rack bar 106. This allows the table 37 to slide backward downwardly until the dog 108 again engages the teeth 106, this point of engagement taking place when the mechanisms are in the pre-determined adjusted relations.

In the operation of the machine a tire such as the one T having the side rings U placed thereon and the core member V therein, is placed upon the supporting rolls 34, between the rolls 33 and 34, the gate 27 of the shuttle ring 9 being opened to permit the positioning of the tire. If the inclined tire supporting and holding means C is not in the proper relation to the shuttle means B, the movement thereof into proper operative position may be effected through the means F. After the tire is positioned the gate is closed and held in closed position by the latch means 29. By opening the valve 52 in the pipe line 51, operating fluid is admitted to the cylinder 49 and the piston rod 53 is forced outwardly against the lug 54 moving the means C which includes the table 37, frame 35, rolls 33 and 34, and frame 39, into the desired operative relation with the shuttle B. The table 37 moves upwardly in an inclined plane upon the supporting surfaces on the base A. The arms 46 which extend upwardly from the table 37 in overlapping relation to the arms 44, together with the rollers 48 cause the frame 39 and rolls 33 thereon to be moved in correspondence with the movement of the frame 35 and rolls 34. The frame 39 being pivotally suspended from the carriage 32 will move freely with the movement of the corresponding parts, the carriage 42 rolling freely upon the frame member 43 and the frame 39 swinging on its pivot so as to accommodate itself to the angular disposition of the frame 35. The extent of movement of the means C and its coöperating parts is predetermined and controlled by the means H. If the tire that is supported and held by the means C is of a 41-inch circumference the disk or dial 99 is moved so that the designation 41 thereon alines with the indicator or pointer 105 and movement of this disk to bring it into position causes adjustment of the rack bar 103 into the proper position relative to the rack member 106. Thus when the table 37 moves upwardly carrying with it the pawl 108, which pawl rides over the teeth of the rack bar 106, the roller 110 on the end of the pawl will engage with the cam face 104 of said rack bar 103 and lift the pawl out of operative relation with the rack bar 106. The valve 52 is closed and this will allow the table 37 and coöperative parts to slide backwardly until the roller 110 rides off of the cam face 104 and the pawl again comes into contact with the rack 106, holding the table and supported parts in the predetermined position. When the parts of the machine are in the hereinbefore described relations operating fluid may be admitted to the cylinder 73 of the means E by opening the valve 78. The piston 74 and piston rod 75 are then retracted or moved inwardly relative to the cylinder, communicating a pull through the link 76 to the pivoted frame member 43. When the frame member 43 is pulled downwardly as described the frame 39 and rolls 33 are forced downwardly and said rolls will firmly press upon the tire T. The pressure of the rolls 33 is regulated so that it will not materially retard rotation of the rolls during operation of the machine. The bearings provided for the rolls permit of the firm pressing thereof upon the tire and at the same time allow free rotation of the roller. The motor 21 is next started and serves to drive both the rolls 33 and 34 and the shuttle means B. The motor pinion 22 drives the shaft 22″ for the roller 4 through the gear 22′, and the roller 4 transmits rotation to the rollers 5, 6, 7, and 8 and to the ring 9 through the belt 26. The ring 9 has superficial bearing contact with the rollers 4, 6 and 8 and this contact together with the engagement of the belt 26 with the ring provides for a reliable rotation of the shuttle. As the ring 9 rotates the wrapping material 15 is applied to the tire. This wrapping material 15 is first suitably fixed by hand to the tire and upon the commencement of operation of the machine will be automatically wrapped around the tire, the application taking place between the ends of the frames 35 and 39 and between the ends of the sets of rolls 33 and 34 on said frames. The rolls 33 and 34 are rotated so as to feed or rotate the tire T, during the wrapping operation, this rotation of the rolls 33 and 34 being provided for as follows: The sprocket 23' upon the shaft 22'' drives the chain 23 which drives the sprocket 24 and the shaft 24'. This shaft 24' through the medium of the worms 59 rotates worm wheels 58, shafts 55 and 56, worms 60, worm wheels 61 and pinions 64, 65 and 66, each of the rolls 33 and 34 carrying the pinions 65. The rolls 33 and 34 rotating slowly, move the tire gradually past the opened portions of the frames 35 and 39 and the opened portions of the frames 35 and 39 are disposed in line with the shuttle. The shuttle ring 9 is rotated in the direction of the arrows shown in Fig. 1 of the drawings, in a counter-clockwise direction, and as shown in said figure the material 15 is unreeled from the underside of the drum 14 therefor. Since the means C is stationary and the ring 9 rotates, the drum carrying the wrapping material has described an orbit around the tire and an even wrapping of the material 15 upon the tire is provided. The rolls 33 and 34 in pressing upon the tire cause the wrapping to be evenly applied and this is also provided for by the application of the material under tension.

Inasmuch as the tire is supported in an inclined position and has a tendency, due to force of gravity, to move out of its properly centered position, it is necessary to operate the means G for centering the tire. The rollers 88 and 89 on the ends of the arms 85 and 86 engage the tire at spaced points and either one of said rollers may be moved inwardly toward the center of the tire by operation of the piston 94 within the cylinder 93. By turning the valve 96 in one direction operating fluid is admitted to the cylinder 93 so as to move, for example, the roller 88 inwardly. This action takes place as hereinbefore described through a system of links and levers which at the same time causes the roller 89 to be moved away from the tire, or, if desired the valve may be operated so as to cause the roller 89 to be moved inwardly and the one 88 outwardly. It will thus be seen that an equalizing centering action may be readily provided by the proper operation of the valve 96 and the tire may be properly centered at all times.

After the tire has been wrapped operation of the machine is stopped and the gate portion 27 of the ring 9 is unlatched by releasing the latch means 29. The roller 30 on the gate portion 27 will engage the member 31 and support the latter in open position.

At this time the operating fluid is shut off from the cylinder 73 and pressure upon the rolls 33 is relieved. The wrapping material 15 may be cut and the tire T which at this time is completely covered by the wrapping material 15 is removed from between the rolls 33 and 34 through the opening in the ring 9, and is ready to be cured.

It will be seen that by providing the shiftable or adjustable tire supporting means C tires of various sizes may be effectively wrapped and the mechanism may be set for the wrapping of tires of various sizes by the proper manipulation of the means H.

It will be noted that the angular position of the tire supporting means C greatly facilitates the handling of the tire during the wrapping operation and the proper positioning of the tire that is necessary to provide for an even and expeditious wrapping of the fabric thereon. When the tire is supported upon the rolls 34 the tendency of the tire is to move downwardly due to gravity action, and said tire at all times rests in engagement with the centering means G. As operating fluid is at all times admitted to the cylinder 93 and cushioned against the piston 94, the arms 86 and 85 are yieldingly disposed in position to hold the rollers 88 and 89 in the correct position to effect the desired centering of the tire. Thus a somewhat automatic centering action of the tire is provided.

While the foregoing description and accompanying drawings describe and illustrate the preferred embodiment of the invention, it is to be understood that various minor changes as to details of construction, size and proportion of parts, of the machine, may be resorted to when required, without departing from the true spirit and scope of the invention as defined.

Having thus disclosed my invention, I claim and desire to secure by Letters Patent:

1. In a machine of the character disclosed, means for supporting an object to be wrapped, said means comprising an upper and lower set of rollers between which rollers such object is disposed, means for adjusting said rollers bodily to adapt the same to accommodation of objects of varying dimensions, and means whereby the upper and lower sets of rollers are maintained in a proper relation to each other and permitted free relative up and down movement thereof.

2. In a machine of the character disclosed, means for supporting an object to be wrapped, said means including an upper and lower set of rollers, each set of which comprises a plurality of groups of rollers arranged in opposed relation and between which groups such object is disposed, and means for adjusting both sets of rollers to adapt the same to accommodation of objects of varying dimensions; said rollers being arranged so that the axis of each roller in one group is angularly disposed with relation to the axis of each roller in the other group.

3. In a machine of the character disclosed, a plurality of groups of rollers between which an article to be wrapped is disposed, and means for varying the disposition of an article between said groups; said means comprising commonly pivoted arms bearing rollers adapted to be engaged with the article to be wrapped, and piston-controlled means for producing pivotal movement in said arms.

4. In a machine of the character disclosed, an upper and lower set of rollers, each set including a plurality of groups of rollers between which an article to be wrapped is disposed and means for bodily shifting both sets of rollers to accommodate articles of varying dimension; said groups of rollers being arranged so that the axis of each roller in one group is angularly disposed with relation to the axis of the roller in the other group.

5. In a machine of the character disclosed, an inclined support, a first group of rollers mounted upon said inclined support, means for supporting a second group of rollers in opposition to said first group of rollers, and means for adjusting both of said groups of rollers whereby said first group of rollers traverses said inclined support; means being provided for controlling said adjustment and whereby the range of traverse of said inclined support by said first group of rollers may be predetermined.

6. In a machine of the character disclosed, an inclined support, a first group of rollers mounted upon said inclined support, means for supporting a second group of rollers in opposition to said first group of rollers, and means for adjusting both of said groups of rollers whereby said first group of rollers traverses said inclined support; means being provided for controlling said adjustment and whereby the range of traverse of said inclined support by said first group of rollers may be predetermined; said last named means comprising a rack upon said inclined support, a dog movable with said first group of rollers, and cam means coöperating with said dog to free the same from said rack at a selected point in the travel of said first named group of rollers.

7. In a machine of the character disclosed, an inclined support, a frame provided with rollers and mounted upon said inclined support, a pivotally mounted frame member, a second frame provided with rollers and pivotally connected with said pivotally mounted frame member, and means for pivotally actuating said pivotally mounted frame member to exert pressure upon an article disposed between the rollers of said respective frames.

8. In a machine of the character disclosed, an inclined support, a frame provided with rollers and mounted upon said inclined support, a pivotally mounted frame member, a second frame provided with rollers and pivotally connected with said pivotally mounted frame member, and means for pivotally actuating said pivotally mounted frame member to exert pressure upon an article disposed between the rollers of said respective frames; in combination with means for rotating one of said sets of rollers, and means for applying wrapping material to an article disposed between said sets of rollers and caused to move responsive to the rotation thereof.

9. In a machine of the character disclosed, means for supporting an article to be wrapped in inclination to the horizontal, a pivotally mounted member through which pressure is applied to and through such means, and an operative connection between said member and said article supporting means, the same being slidably associated with said member and pivotally connected with said article supporting means.

10. In a machine of the character disclosed, a plurality of groups of rollers between which is disposed an article to be wrapped, said groups of rollers being disposed in inclined planes; positioning rollers against which such article is adapted to bear and which positioning rollers oppose gravital displacement of such article; overlapping pivotally connected arms being provided for the support of said positioning rollers respectively, in combination with a piston-actuated member, and links operatively connecting the same with said arms.

11. In a machine of the character disclosed, a support, a calibrated disk rotatably mounted upon the support, a cam member mounted for movement responsive to rotation of the disk, a rack, a table movable upon the support, a pawl carried by the table and disposed for coöperation with the rack, and means on the pawl for coöperation with the cam to control the operation of the pawl relative to the rack.

12. In a machine of the character disclosed, a support, a calibrated disk rotatably mounted upon the support, a cam member mounted for movement responsive to rotation of the disk, a rack, a table movable upon the support, a pawl carried by the table and disposed for coöperation with the rack, and means on the pawl for coöperation with the cam to control the operation of the pawl relative to the rack; said means comprising a roller.

13. In a machine of the character disclosed, means for supporting an article to be wrapped in an inclined plane, means for causing the same to travel in a definite path, a shuttle for applying wrapping material to such article during the travel thereof, and means for operating the shuttle and confining it to a definite path of travel, the paths of travel of the article and the shuttle lying in intersecting planes; said shuttle being provided with eccentric means coöperating with the means for operating the shuttle whereby the speed of rotation of the shuttle may be varied.

In testimony whereof I have signed my name to this specification in the presence of two subscribing witnesses.

CLAUS SPRECKELS.

Witnesses:
 RAYMOND JACK DUPERLD,
 WILLIS S. MITCHELL.